US009905821B2

(12) United States Patent
Eberhard et al.

(10) Patent No.: US 9,905,821 B2
(45) Date of Patent: Feb. 27, 2018

(54) VEHICLE BATTERY PACKAGING

(75) Inventors: Martin Eberhard, Woodside, CA (US);
Rob Sweney, San Francisco, CA (US);
Jaime Camhi, Sunnyvale, CA (US);
Brian Ng, San Francisco, CA (US);
Heiner Fees, Bietigheim-Bissingen (DE); Alexander Eichhorn, Eppingen Muehlbach (DE)

(73) Assignees: VOLKSWAGEN AG, Wolfsburg (DE);
AUDI AG, Ingolstadt (DE)

( * ) Notice: Subject to any disclaimer, the term of this patent is extended or adjusted under 35 U.S.C. 154(b) by 322 days.

(21) Appl. No.: 13/009,529

(22) Filed: Jan. 19, 2011

(65) Prior Publication Data

US 2012/0121949 A1    May 17, 2012

Related U.S. Application Data

(60) Provisional application No. 61/413,735, filed on Nov. 15, 2010.

(51) Int. Cl.
*H01M 2/12* (2006.01)
*H01M 2/10* (2006.01)
(Continued)

(52) U.S. Cl.
CPC ........... *H01M 2/105* (2013.01); *H01M 2/206* (2013.01); *H01M 10/613* (2015.04);
(Continued)

(58) Field of Classification Search
CPC ...... H01M 2/10; H01M 2/1016; H01M 2/105; H01M 2/0242; H01M 2/1252;
(Continued)

(56) References Cited

U.S. PATENT DOCUMENTS 4,584,324 A     4/1986  Bauman et al.
6,528,206 B2 *  3/2003  Ruiz Rodriguez et al. .. 429/204
(Continued)

FOREIGN PATENT DOCUMENTS

CN      101378110       3/2009
CN      101523635       9/2009
WO      WO2010/067602  * 6/2010

OTHER PUBLICATIONS

Thermal Management of Batteries in Advanced Vehicles Using Phase-Change Materials, http://www.nrel.gov/transportation/energystorage/pdfs/42544.pdf, 2007.*
(Continued)

Primary Examiner — Lisa S Park
(74) Attorney, Agent, or Firm — Andrews Kurth Kenyon LLP

(57) ABSTRACT

A vehicle battery packaging for accommodating a plurality of longitudinal battery cells, wherein the battery cells are arranged in a frame in parallel with respect to their longitudinal axes, and wherein each battery cell has a first end and an opposite second end with respect to the longitudinal axis, the battery packaging including: a conductor plate adapted to electrically couple to the second ends of the battery cells; a cooling plate thermally coupled to the conductor plate; and a gap filler layer sandwiched between the conductor plate and the cooling plate.

18 Claims, 2 Drawing Sheets

(51) Int. Cl.
*H01M 2/20* (2006.01)
*H01M 10/625* (2014.01)
*H01M 10/6551* (2014.01)
*H01M 10/643* (2014.01)
*H01M 10/613* (2014.01)
*H01M 10/50* (2006.01)

(52) U.S. Cl.
CPC ....... *H01M 10/625* (2015.04); *H01M 10/643* (2015.04); *H01M 10/6551* (2015.04)

(58) Field of Classification Search
CPC ......... H01M 2220/20; H01M 2002/02; H01M 10/50; H01M 10/5034; H01M 10/504; H01M 10/5044; H01M 10/5046; H01M 10/5048; H01M 10/5053; H01M 10/5057; H01M 2/0245; H01M 2/025; H01M 2/0262; H01M 2/0265; H01M 10/613; H01M 10/6551; H01M 10/643; H01M 10/625; H01M 2/206

USPC ......................................................... 429/148
See application file for complete search history.

(56) References Cited

U.S. PATENT DOCUMENTS

| | | | |
|---|---|---|---|
| 7,399,551 B2* | 7/2008 | Yagi et al. ..................... | 429/148 |
| 7,579,108 B2* | 8/2009 | Larsson ....................... | 429/100 |
| 2001/0010878 A1 | 8/2001 | Nakanishi et al. | |
| 2002/0098412 A1 | 7/2002 | Rodriguez et al. | |
| 2003/0017383 A1* | 1/2003 | Ura et al. ..................... | 429/120 |
| 2007/0141459 A1* | 6/2007 | Goto et al. ................... | 429/159 |
| 2007/0202792 A1* | 8/2007 | Shimizu .............. | H01M 2/1077 454/69 |
| 2007/0238008 A1* | 10/2007 | Hogan et al. .................. | 429/44 |
| 2009/0208829 A1* | 8/2009 | Howard et al. ............... | 429/120 |
| 2010/0047676 A1 | 2/2010 | Park et al. | |
| 2010/0055556 A1* | 3/2010 | Meschter ............ | H01M 2/1077 429/159 |
| 2010/0116570 A1* | 5/2010 | Sugawara ............... | B60K 1/04 180/65.1 |
| 2010/0173181 A1* | 7/2010 | Okada ................. | H01M 2/1077 429/53 |
| 2010/0216004 A1* | 8/2010 | Yoon .............................. | 429/99 |
| 2011/0195284 A1* | 8/2011 | Yasui .................. | H01M 2/0242 429/82 |

OTHER PUBLICATIONS

Chinese Office Action, dated Nov. 28, 2013, issued in corresponding Chinese Patent Application No. 201110463156.X.

* cited by examiner

VEHICLE BATTERY PACKAGING

CROSS-REFERENCE TO RELATED APPLICATIONS

The present application claims the benefit of U.S. Provisional Patent Application Ser. No. 61/413,735, filed on Nov. 15, 2010, which is expressly incorporated herein in its entirety by reference thereto.

FIELD OF THE INVENTION

The present invention relates to a vehicle battery packaging, especially a vehicle battery packaging or a vehicle battery module for use in an electric vehicle with an electrical engine driving the vehicle.

SUMMARY

According to example embodiments, a vehicle battery packaging for accommodating a plurality of longitudinal battery cells is provided. The battery cells are arranged in a frame of the battery packaging in parallel with respect to their longitudinal axis. Each battery cell has a first end and an opposite second end with respect to the longitudinal axis. The vehicle battery packaging includes a conductor plate adapted to electrically couple the second ends of the battery cells and a cooling plate thermally coupled to the conductor plate. Furthermore, the vehicle battery packaging includes a gap filler layer which is sandwiched between the conductor plate and the cooling plate.

According to example embodiments, a vehicle battery packaging for accommodating a plurality of longitudinal battery cells is provided. The battery cells are arranged in parallel with respect to their longitudinal axis. Each battery cell has a first end and an opposite end with respect to the longitudinal axis. The vehicle battery packaging includes a frame including a plurality of holding structures configured to receive the first end of the battery cells, a conductor plate adapted to couple to the first ends of the battery cells, and a cover. The conductor plate is sandwiched between the frame and the cover. The frame includes ventilation openings which are arranged to be aligned to safety vents of the battery cells at the first ends of the battery cells, when the holding structures of the frame hold the plurality of battery cells. The conductor plate includes ventilation openings which are aligned to the ventilation openings of the frame. The cover includes ventilation channels which extend in the plane of the cover and which are configured to guide gas from further ventilation openings formed in the conductor plate to an edge of the cover.

According to example embodiments, a vehicle battery packaging for accommodating a plurality of longitudinal battery cells is provided. The battery cells are arranged in parallel with respect to their longitudinal axis and each battery cell has a first end and an opposite second end with respect to the longitudinal axis. The vehicle battery packaging includes a first frame and a second frame. The first frame includes a plurality of first holding structures configured to receive the first ends of the battery cells. The second frame includes a plurality of second holding structures configured to receive the second ends of the battery cells. The second frame includes a plurality of frame elements and each frame element is configured to receive a part of the plurality of the second ends of the battery cells.

According to example embodiments, a vehicle battery packaging for accommodating a plurality of longitudinal battery cells is provided. The battery cells are arranged in parallel with respect to their longitudinal axis and each battery cell has a first end and an opposite second end with respect to the longitudinal axis. The vehicle battery packaging includes a first frame including a plurality of first holding structures configured to receive the first ends of the battery cells, and a second frame including a plurality of second holding structures configured to receive the second ends of the battery cells. Each first holding structure of the first frame includes an elastic element configured to exert a force on the respective battery cell in the direction of the second frame in an assembled configuration of the first frame, the second frame, and the battery cell.

Although certain features described in the above summary and the following detailed description are described in connection with particular example embodiments, it is to be understood that the features described herein can be combined with each other unless it is noted otherwise.

Hereinafter, exemplary embodiments of the present invention will be described with reference to the drawings.

DETAILED DESCRIPTION

Figure 1:
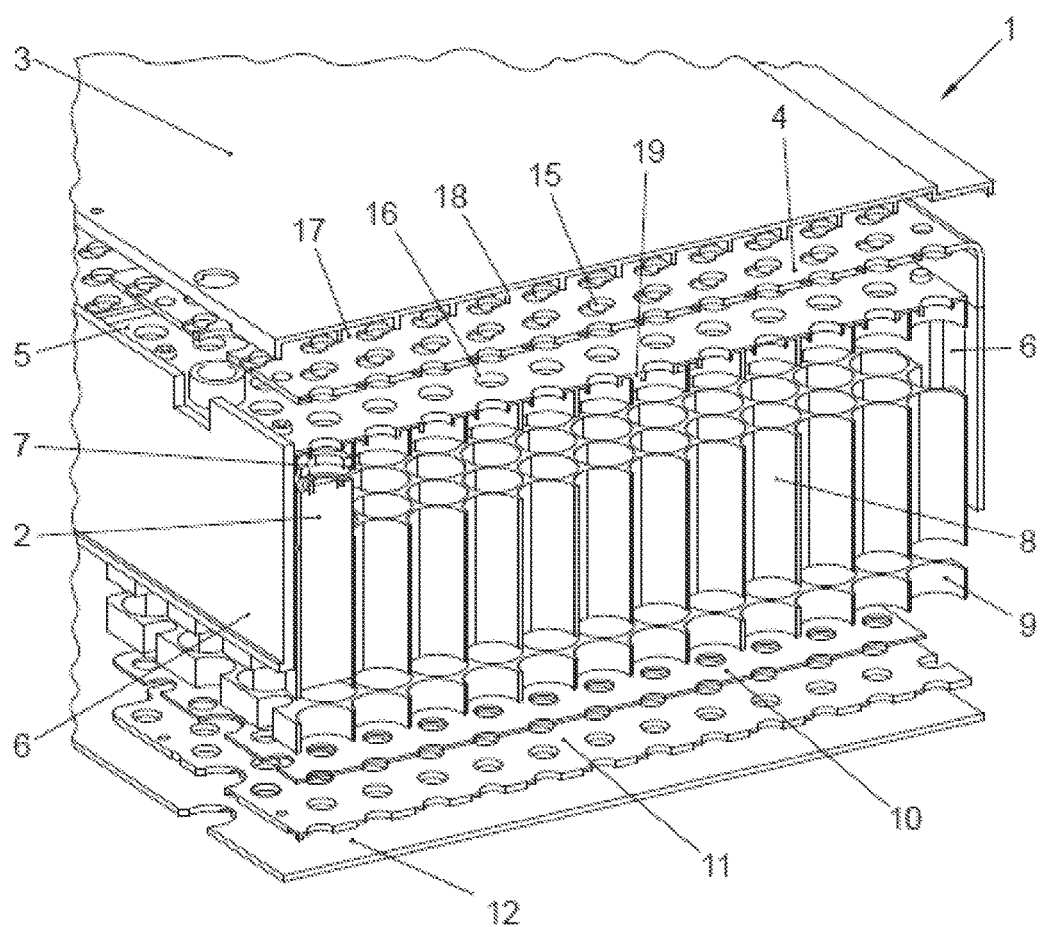
FIG. 1 schematically illustrates a vehicle battery packaging according to an example embodiment of the present invention in an exploded respective view.

In the following, exemplary embodiments of the present invention are described in greater detail. It is to be understood that the following description is given only for the purpose of illustrating the principles hereof the invention and is not to be taken in a limiting sense.

It is to be understood that in the following detailed description of example embodiments, any direct connection or coupling between functional blocks, devices, components or other physical or functional units shown in the drawings or described herein may also be implemented in an indirect connection or coupling. Same reference signs in the various instances of the drawings refer to similar or identical components. Furthermore, it is to be understood that the features of the various exemplary embodiments described herein may be combined with each other unless specifically noted otherwise.

In electric vehicles or hybrid vehicles including at least one electrical engine for driving the vehicle, large vehicle battery packs or battery modules are provided for storing and providing electrical energy for the electrical engine. Typically, the battery module of an electric vehicle may include several hundred up to several thousands of battery cells. There are many functional requirements for a vehicle battery pack, some of which are very difficult to accomplish in unison. These functional requirements include for example a high energy density of the vehicle battery pack, a low number of components for producing the battery pack, and a low total weight of the battery pack. Furthermore, a reliable production of the battery pack is required. Additionally, many functional requirements in operation of the vehicle battery pack have to be considered as will be shown in the following.

For high power applications, it is important that electrical connections have minimal power loss. Therefore, each battery cell should have a reliable electrical connection to a battery circuit on its positive and negative ends. Voltages higher than a single cell voltage are desirable to reduce the amount of current flow and thus a loss of power for a given power rating, therefore parallel subsets of battery cells, so-called p-groups, are connected in series.

Self-degradation of a battery cell over time is highly dependent on its temperature. A hotter battery cell ages much more quickly. Performance of a battery pack is limited to that of the very worst battery cell, so it is important to maintain a consistent temperature across all battery cells within the battery assembly of a battery pack. This requires a thermal management system and may require a cooling system that will control the battery pack temperature for safety and longevity.

The battery pack must withstand standard automotive operating conditions for the life of the vehicle. Therefore, requirements concerning robustness and structural longevity must be fulfilled. Furthermore, the battery pack must also meet applicable crash requirements without becoming a safety hazard.

The battery pack may be replaceable during lifetime of the vehicle and therefore safe handling of the battery pack is required. A single module of the battery pack or the battery pack as a whole should be covered with insulation, so that no electrically live components are exposed. The covering should be robust enough to withstand reasonable abuse. A field replaceable unit (FRU) which may be the battery pack as a whole or a part of the battery pack, should also be structurally robust for handling, shipping and installation.

A manufacturing defect or catastrophic event, for example extreme heat, foreign object penetration, may cause a battery cell to go into a so-called "thermal runaway" which means a rapid exothermic reaction that can briefly produce lots of heat. Flame and hot gases are exhausted from vent holes around the positive cap of the battery cell and the battery cell itself becomes hot. The thermal runaway of one battery cell may trigger a thermal runaway in a battery cell nearby if the nearby battery cell absorbs enough heat from the first battery cell. This may start a problematic chain reaction called "cell propagation." It is therefore desirable that a battery pack design will survive a single-cell thermal runaway and prevent cell propagation from happening in the automotive environment.

The battery pack must hold a large number of battery cells to meet the energy requirements of the vehicle, for example, several hundreds to several thousands of battery cells. A flexible architecture may be beneficial because it provides different packs to be configured for different applications, but based on the same arrangement. A more efficient arrangement will therefore benefit an entire product line.

In the present context, the terms battery module, battery pack, and battery packaging are used synonymously including a plurality of longitudinal battery cells arranged and electrically coupled in parallel, a so-called "p-group." Furthermore, a battery packaging may include several p-groups in a serial connection.

According to example embodiments, a vehicle battery packaging for accommodating a plurality of longitudinal battery cells is provided. The battery cells are arranged in a frame in parallel with respect to their longitudinal axis. Each battery cell has a first end and an opposite second end with respect to the longitudinal axis. The battery packaging includes a conductor plate, a cooling plate, and a gap filler layer. The connector plate is configured to electrically couple the second ends of the battery cells. The cooling plate is thermally coupled to the conductor plate, and the gap filler layer is sandwiched between the conductor plate and the cooling plate. The gap filler layer may include an electrically insulating material. Furthermore, the gap filler layer may include a thermally conducting material. For example, the gap filler layer has a rugged surface and includes a foam material with glass fiber reinforcements. The cooling plate may include a liquid cooled cooling plate.

In the present context, the battery cells may have a cylindrical shape having a positive electrical terminal at the first end and a negative electrical terminal at the second end. However, the battery cells may have any other shape, for example, a prismatic or a polygonal shape and an opposite polarity.

For connecting multiple cells in parallel, the second ends (for example the negative electrical terminals) of the battery cells may be oriented to a common plane and a conductor plate may be placed to cover the second ends. In the same manner, the first ends (for example the positive electrical terminals) may be covered with a corresponding conductor plate. By additional features, for example springs or weldings, a reliable contact between each cell and the conductor plates can be accomplished.

The thermal conductivity of cylindrical battery cells is orthotropic, that means that heat of the battery cell flows best through the negative end of the cell surface. Therefore, it is highly desirable to align many parallel groups of battery cells in the same plane and attach a single preferably liquid cooled cooling plate to the negative ends of the cells. However, this location is also optimal for electrical connection with the conductor plate. Incorporating the cooling function into the cooling plate with a common liquid cooling may cause a short circuit across parallel groups connected in series. Even if sections of the liquid cooled cooling plate below each parallel group are electrically isolated, a charge flowing through the plate might cause corrosion through ionization of the liquid, leading to a severe reduction in cooling system performance. Therefore, according to example embodiments described herein, the conductor plate is electrically coupled to the negative ends of the battery cells, and the cooling plate is thermally coupled to the connector plate and electrically isolated from the conductor plate via the gap filler layer sandwiched between the conductor plate and the cooling plate. For further improvement of thermal contact between the battery cells and the conductor plate a graphite foil may be sandwiched between the negative ends of the battery cells and the conductor plate.

According to example embodiments, a vehicle battery packaging for accommodating a plurality of longitudinal battery cells includes a frame, a conductor plate, and a cover. The frame includes a plurality of holding structures configured to receive the first ends, for example, the positive ends, of the battery cells, and the conductor plate is coupled to the first ends of the battery cells. The conductor plate is sandwiched between the frame and the cover. The frame includes a ventilation opening arranged to be aligned to safety vents of the battery cells at the first ends of the battery cells, when the holding structures of the frame hold the plurality of battery cells. The conductor plate includes further ventilation openings aligned to the ventilation openings of the frame. The cover includes ventilation channels which extend in the plane of the cover and are configured to guide gas from the further ventilation openings formed in the conductor plate to an edge of the cover.

As described above, in parallel groups of battery cells, the negative ends of the battery cells are connected to a common conductor plate and the positive ends are commonly coupled to a further common conductor plate. However, the conductor plate on the first end (the positive side) of the battery cell may block each cell's safety vent and in the event of a thermal runaway this will cause hot gases to build up inside the packaging, making cell propagation very likely to occur. Therefore, according to the above-described example embodiment, ventilation openings are arranged aligned to the safety vents in the conductor plate as well as in the frame holding the first end of the battery cells. Furthermore, the cover includes ventilation channels configured to guide the gas from the ventilation openings to an edge of the cover. The ventilation channels may be formed on the cover so as to be parallel to each other. Furthermore, each one of the ventilation channels may extend across a plurality of ventilation openings in the conductor plate. Thus, hot gasses from a safety vent of one battery cell may be guided reliably from the one battery cell through the ventilation openings of the frame and the conductor plate and further through the ventilation channel to the outside of the battery packaging. This avoids heating up other battery cells in the battery packaging and prevents a cell propagation.

According to example embodiments, a vehicle battery packaging for accommodating a plurality of longitudinal battery cells includes a first frame and a second frame. The first frame includes a plurality of first holding structures configured to receive the first ends of the battery cells, and the second frame includes a plurality of second holding structures configured to receive the second ends of the battery cells. The second frame includes a plurality of frame elements, wherein each frame element is configured to receive a part of the plurality of second ends. As it may be required that a large number of battery cells is held within one vehicle battery packaging, a high mechanical accuracy may be required for the first frame and the second frame to keep the battery cells aligned and to make sure that the first frame and the second frame fit together. Therefore, according to the above-described example embodiment, the second frame includes a plurality of frame elements and each frame element receives only a part of the plurality of second ends of the battery cells. Therefore, the combination of the first frame and the plurality of frame elements of the second frame becomes more tolerant concerning a fitting accuracy. Furthermore, by holding the battery cells at the first and second ends of the battery cells only, a minimal mass and volume of the holding structures and the frames can be achieved. Therefore, a weight and cost of the battery packaging can be reduced, especially in large battery packs where thousands of battery cells are to be accommodated.

According to example embodiments, the first holding structures of the first frame and the second holding structures of the second frame are configured to hold the battery cells spaced with gaps between peripheral surfaces of the battery cells. The gaps may be filled with air, an insulation material or a phase changing material. Filling the gaps with air may provide a good ventilation and thus a good cooling of a peripheral surface of the battery cells. Filling the gaps with an insulation material provides a thermal decoupling from the battery cells avoiding a thermal cell propagation. The phase changing material (PCM) in the gaps may avoid a fast heating up of the battery cells.

According to example embodiments, a vehicle battery packaging for accommodating a plurality of longitudinal battery cells includes a first frame including a plurality of first holding structures configured to receive the first ends of the battery cells, and a second frame including a plurality of second holding structures configured to receive the second ends of the battery cells. Each first holding structure of the first frame includes an elastic element configured to exert a force on a battery cell in the direction of the second frame in an assembled configuration of the first frame, the second frame, and the battery cell. In automotive operation conditions, large thermal changes and mechanical stresses, for example vibrations, affect the vehicle battery packaging. By use of the elastic element, for example an elastic rubber ring, the battery cells can be reliably held in between the first frame and the second frame.

The above-described exemplary embodiments will now be described in more detail with reference to the accompanying drawings.

FIG. 1 schematically illustrates an exploded sectional view of a vehicle battery packaging 1. The battery packaging 1 is adapted to accommodate a large plurality of longitudinal cylindrical battery cells 2 which are arranged in parallel with respect to their longitudinal axis. In FIG. 1, the battery cells 2 are arranged such that a positive electrical terminal of each battery cell 2 is at an upper end of the battery cell 2 and a negative electrical terminal of the battery cell 2 is at a lower end of the battery cell 2. In the present context, the terms "upper end" and "first end" are used synonymously, and the terms "lower end" and "second end" are also used synonymously. However, the directional terms "upper" and "lower" relate only to the exemplary embodiment shown in FIG. 1 and do not restrict an orientation of the battery packaging as it is built in a vehicle. The battery packaging 1 may therefore be built in a vehicle in any direction as needed by the application.

From the upper side to the lower side, as shown in FIG. 1, the battery packaging 1 includes a positive cover 3, a positive conductor plate 4, an upper frame 5 including sidewalls 6, for each battery cell an O ring 7, the battery cells 2 with gaps 8 between circumferential sides of the battery cells 2, a lower frame 9, a graphite foil 10, a negative conductor plate 11, and a negative cover 12. As will be shown in connection with FIG. 2, below the negative cover 12 a cooling plate 13 may be arranged. The components 2 to 13 are stacked as shown in FIG. 1 and this stack may be assembled by securing the connector plates to the upper frame, effectively, clamping all parts in between. The covers 3 and 12 may be installed later with fasteners or adhesive.

Figure 2:
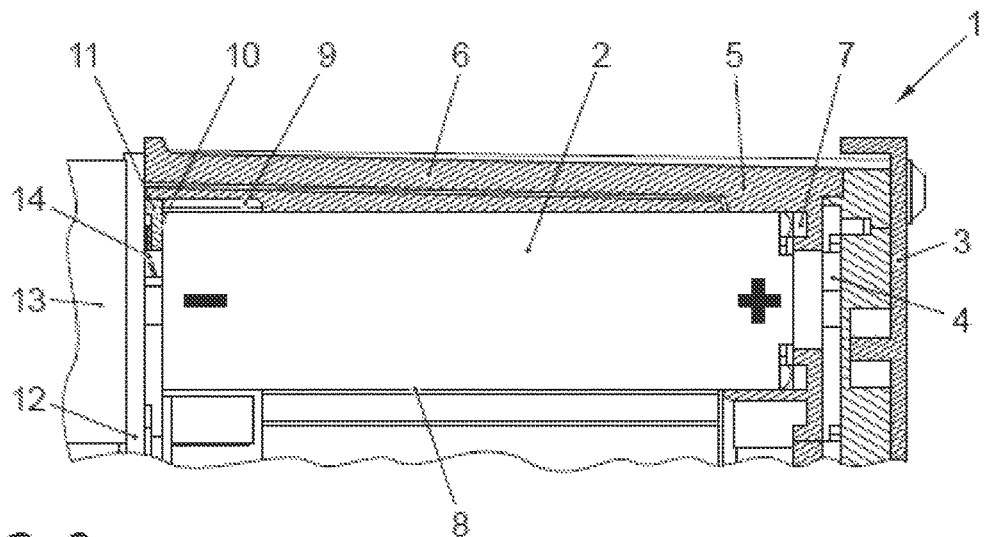
FIG. 2 schematically illustrates a sectional view of a portion of a vehicle battery packaging according to an example embodiment of the present invention in an assembled state.

FIG. 2 shows an enlarged sectional view of one battery cell 2 being enclosed in the assembled battery packaging 1. The upper end of the battery cell 2 is shown in FIG. 2 on the right hand side indicated by the plus symbol, and the lower end of the battery cell 2 is shown in FIG. 2 on the left hand side indicated by the minus symbol. A negative conductor plate 11 is provided with openings for each battery cell 2 through which a bonding wire 14 may be coupled between a lower end of the battery cell 2 and the negative conductor plate 11 for providing a reliable electrical contact between the battery cell 2 and the conductor plate 11. The graphite foil 10 may provide corresponding openings for reaching the lower end of the battery cells 2.

In operation, the battery cells 2 may heat up. However, during normal operation of the battery cells 2, heat dissipation is significantly at the lower side (minus side) of the battery cells 2. Therefore, the negative cover 12 and the conductor plate 11 form a thermal pathway to the battery cells 2. This allows heat from the battery cells 2 to flow out of the negative end of the battery cells 2 through the negative conductor plate 11, through the negative cover 12, and into the cooling plate 13, which may include a liquid cooling system. The negative cover 12 may include a so-called "gap filler" material which is rugged and electrically insulating, but has very high thermal conductivity. The gap filler cover 12 may be for example a foam with glass fiber reinforcements. The electrical conductivity of the gap filler cover 12 may be much less than the electrical conductivity of the negative conductor plate 11. The electrical conductivity of the gap filler cover 12 may be five to ten magnitudes lower than the electrical conductivity of the negative conductor plate 11.

Additionally, the O-ring 7 builds up a force on each battery cell 2 in an assembled state of the battery packaging 1 in the lower direction thus improving the contact of the lower end of the battery cells 2 with the negative conductor plate 11. The graphite foil 10 furthermore improves the contact with the conductor plate 11.

The upper frame 5, the positive conductor plate 4, and the positive cover 3 incorporate a ventilation system. To prevent cell propagation, it is important to quickly evacuate the heat generated by a single battery cell in a thermal runaway. During a thermal runaway, a cell gets extremely hot and hot gas may be emitted from a safety vent at the positive end of the battery cell. Therefore, the upper frame 5 and the positive conductor plate 4 include ventilation openings 16 and 15 which are aligned to the safety vents of the battery cells 2. Furthermore, the positive cover 3 includes ventilation channels 17 extending along the positive cover 3 in a front-to-rear direction shown in FIG. 1. The ventilation channels 17 may be formed by bars 18 extending in a front-to-rear direction on a lower side of the positive cover 3. The ventilation channels 17 may be arranged such that each ventilation channel 17 is aligned to a plurality of ventilation openings 15, 16. Thus, gas emitted from the positive end of the battery cells 2 flows through the ventilation openings 15, 16 and enters the ventilation channels 17 of the positive cover 3 and flows away from other cells. The O-rings 7 may block additionally a flow of hot gas to neighboring battery cells. Thus, the so-called cell propagation can be avoided.

The above described components are connected to the upper frame 5 including the side walls 6, thus satisfying a robust packaging requirement. The upper frame 5 and the side walls 6 may include a high strength thermal plastic, for example a glass fiber reinforced thermoplastic. As described above, the upper frame 5 may contain compressible members, for example the O-rings 7 or additional springs, which urge each of the battery cells 2 to the negative conductor plate 11 to maintain cooling contact and which also create enough battery cell preload to resist motion in high vibration. The upper frame 5 also positions, as described above, each battery cell directly beneath a ventilation channel 17 on the positive side for feeding hot gas into the above-described ventilation system. The conductor plates 4 and 11 may be secured in multiple points to the upper frame 5 and the side walls 6. This adds torsional and structural stiffness to the battery packaging without adding extra weight. Each battery cell 2 is held at the upper end in an upper holding structure 19 of the upper frame 5, and at a lower end of the battery cell 2 in a lower holding structure of the lower frame 9. Between circumferential surfaces of neighboring battery cells 2 a gap 8 is provided between the upper and the lower holding structures, thus holding only the ends of the battery cells 2. Therefore, the cells are separated by the gaps 8 which reduce the possibility of propagation in a thermal runaway event. These gaps 8 can be filled by any material which is advantageous for thermal management and propagation prevention, for example a phase changing material (PCM), air, or a thermal insulation. The lower frame 9 may include a plurality of lower frame elements wherein each lower frame element receives only some of the plurality of lower ends of battery cells 2. Each of the lower frame elements can be locally adjusted with respect to the upper holding structures 19. This avoids requirements for high dimensional accuracy of the lower frame 9.

Figure 3:
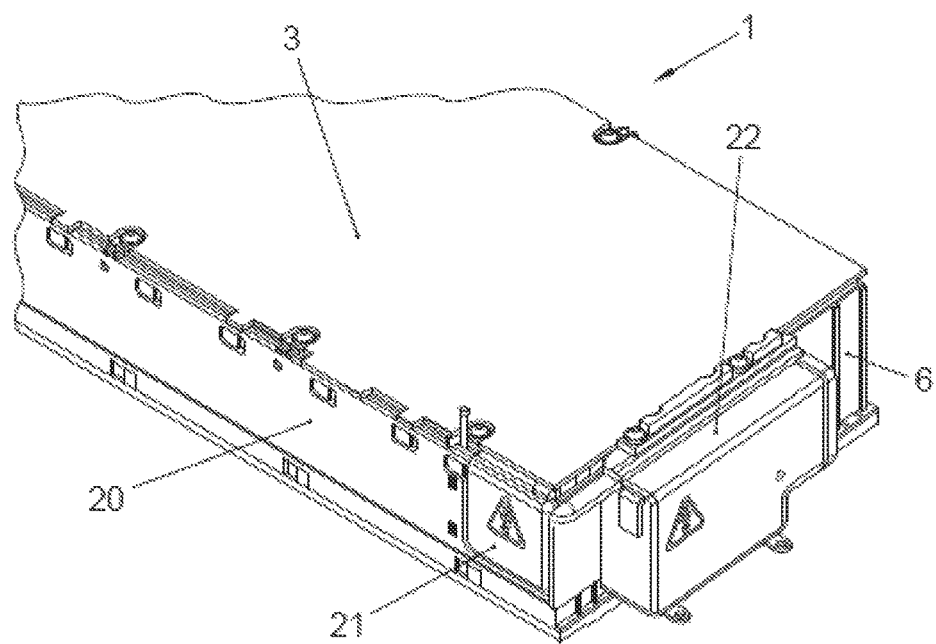
FIG. 3 schematically illustrates a perspective view of an assembled vehicle battery packaging.

FIG. 3 shows the battery packaging 1 in an assembled state. The sidewalls 6 are partly covered with an interconnect cover 20. Thus, all outer surfaces are robust and resist puncture. Furthermore, in FIG. 3 a terminal cover 21 covering electrical terminals of the battery packaging 1, and a controller cover 22 covering an electrical control circuit of the battery packaging 1 are shown.

While exemplary embodiments have been described above, various modifications may be implemented in other example embodiments. For example, any number of battery cells may be incorporated within one battery packaging. Furthermore, battery cells with other shapes than cylindrical shapes may be used, for example, prismatic battery cells.

What is claimed is:

1. A vehicle battery packaging for accommodating a plurality of longitudinal battery cells, the battery cells being arranged in parallel with respect to their longitudinal axes, and each battery cell having a first end and an opposite second end with respect to the longitudinal axis, comprising:
   a frame including a plurality of holding structures configured to receive the first ends of the battery cells;
   a first conductor plate coupled to the first ends of the battery cells; and
   a cover extending more in a direction perpendicular to the longitudinal axes of the battery cells than in a direction parallel to the longitudinal axes of the battery cells, and completely covering the first ends of the battery cells;
   a second conductor plate electrically coupled to the second ends of the battery cells;
   a liquid cooled cooling plate thermally coupled to the second conductor plate; and
   a gap filler layer sandwiched between the second conductor plate and the liquid cooled cooling plate; wherein the gap filler layer includes an electrically insulating material;
   wherein the first conductor plate is sandwiched between the frame and the cover;
   wherein the frame includes ventilation openings arranged to be aligned to safety vents at the first ends of the battery cells that exhaust hot gas when overheated, when the holding structures of the frame hold the plurality of battery cells;
   wherein the first conductor plate includes further ventilation openings aligned to the ventilation openings of the frame; and
   wherein the cover includes a plurality of formed parallel ventilation channels formed within a plane in the cover, each ventilation channel configured to provide removal of the hot gas through different ventilation openings in the frame and the further ventilation openings in the first conductor plate, over the first ends of one or more battery cells, to an edge of the cover.

2. The vehicle battery packaging according to claim 1, wherein the gap filler layer includes a thermally conducting material.

3. The vehicle battery packaging according to claim 1, wherein the gap filler layer has a rugged surface and includes a foam material with glass fiber reinforcement.

4. The vehicle battery packaging according to claim 1, further comprising a graphite foil sandwiched between the second ends of battery cells and the second conductor plate.

5. The vehicle battery packaging according to claim 1, wherein the cooling plate includes a liquid cooled cooling plate.

6. The vehicle battery packaging according to claim 1, wherein the battery cells have a cylindrical shape having a positive electrical terminal at the first end and a negative electrical terminal at the second end.

7. The vehicle battery packaging according to claim 1, wherein each of the ventilation channels extends across a plurality of the further ventilation openings of the first conductor plate.

8. The vehicle battery packaging according to claim 1, wherein a longitudinal axis of the ventilation channels are perpendicular to an axial direction of the further ventilation openings in the first conductor plate.

9. The vehicle battery packaging according to claim 1, wherein the battery cells have a cylindrical shape having a positive electrical terminal at the first end and a negative electrical terminal at the second end.

10. A vehicle battery packaging for accommodating a plurality of longitudinal battery cells, the battery cells being arranged in parallel with respect to their longitudinal axes, and each battery cell having a first end and an opposite second end with respect to the longitudinal axis, and having safety vents to exhaust hot gas when overheated, comprising:
a first frame including a plurality of first holding structures configured to receive the first ends of the battery cells;
a second frame including a plurality of second holding structures configured to receive the second ends of the battery cells; and
at least one cover having a plurality of ventilation channels formed within a plane in the cover, each ventilation channel to provide removal of the hot gas to the exterior of the battery packaging through different ventilation openings in at least one of the first frame and/or the second frame;
a conductor plate electrically coupled to the second ends of the battery cells;
a liquid cooled cooling plate thermally coupled to the second conductor plate; and
a gap filler layer sandwiched between the conductor plate and the liquid cooled cooling plate; wherein the gap filler layer includes an electrically insulating material;
wherein the first frame is configured to receive the plurality of first ends; and
wherein the second frame includes a plurality of independently adjustable frame elements, each frame element configured to receive only a part of the plurality of second ends.

11. The vehicle battery packaging according to claim 10, wherein the first holding structures of the first frame and second holding structures of the second frame are configured to hold the battery cells spaced with gaps between peripheral surfaces of the battery cells.

12. The vehicle battery packaging according to claim 11, wherein the gaps are filled with a phase changing material.

13. The vehicle battery packaging according to claim 10, wherein the battery cells are isolated from vibrational motion by elastic elements including at least one of o-rings and springs.

14. The vehicle battery packaging according to claim 10, wherein o-rings isolate the hot gas from other battery cells.

15. A method of cooling the vehicle battery packaging of claim 1, the method comprising:
receiving, by the frame including a plurality of holding structures, the first ends of the battery cells;
ventilating, by the frame, hot gas exhausted from the safety vents during overheating;
ventilating, by the first conductor plate;
providing, by the cover, isolated removal of hot gas through the ventilation channels; and
separately transferring heat from the battery cells through at least one of conduction and convection from at least one of battery cell peripheral surfaces and the opposite second ends,
wherein heat transfer between the battery cells is minimized.

16. The method of claim 15 further comprising filling gaps between the battery cells with a phase changing material.

17. The method of claim 15 further comprising isolating the hot gas from other battery cells with o-rings.

18. The vehicle battery packaging according to claim 1, wherein an electrical conductivity of the gap filler layer is at least five orders of magnitude lower than an electrical conductivity of the second conductor plate.

* * * * *